Aug. 31, 1943.                W. R. JONES                2,328,281
                      PHOTOGRAPHIC JIG SAW PUZZLE
                         Filed Sept. 20, 1941

INVENTOR
WALTER R. JONES
BY
*Geo. A. Senior*
ATTORNEY

Patented Aug. 31, 1943

2,328,281

UNITED STATES PATENT OFFICE 2,328,281

PHOTOGRAPHIC JIGSAW PUZZLE

Walter R. Jones, Brooklyn, N. Y.

Application September 20, 1941, Serial No. 411,615

1 Claim. (Cl. 95—8)

The invention relates to photographic jig saw puzzles.

The principal object of the present invention is to provide a novelty in the form of a jig saw puzzle on which a person's picture or other appropriate subject matter is printed by photography on the face or one surface of the jig saw puzzle.

Other advantages and objects will become apparent as this specification proceeds. Referring to the drawing forming a part thereof:

Figure 3:
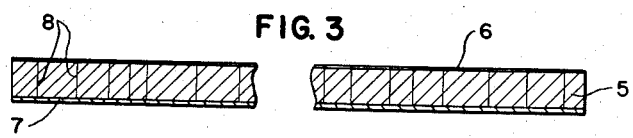
Fig. 3 is a broken sectional view on a larger scale and is taken on line 3—3 of Fig. 1.

Referring again to the drawing a piece of cardboard or any other suitable sheet material 5 is photo-sensitized on one surface as indicated at 6. The jig saw puzzle is then cut and the parts are held together by a layer of suitable material indicated at 7 in Fig. 3. Obviously the photo-sensitized coating might be applied after the puzzle has been cut instead of before.

The layer of material 7 might be an extremely thin sheet of paper or Cellophane that will hold the parts of the puzzle together during the developing and fixing operations and will not leave any ragged edges when the puzzle is taken apart. It might also be a coating of some suitable shellac, varnish or other preparation that will withstand the action of the solutions used for developing or fixing but will distintegrate under heat while drying the picture.

Figure 1:
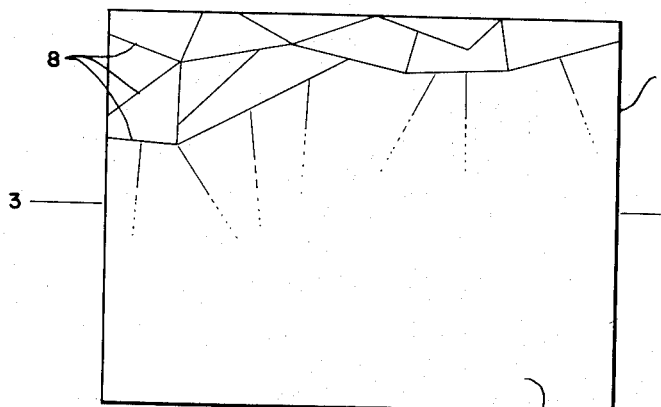
Fig. 1 is a plan view of the jig saw puzzle.
Figure 2:
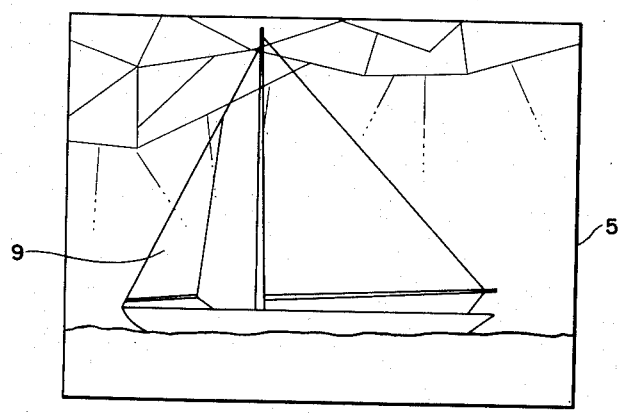
Fig. 2 is a similar view after the picture has been developed.

The lines of parting in the jig saw puzzle are indicated by the reference numeral 8. Fig. 2 illustrates the jig saw puzzle with the picture 9 developed thereon. Obviously the assembled puzzle will be wrapped in a light-proof package that will not be opened except in the dark room prior to making the picture.

Figure 4:
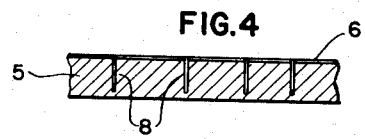
Fig. 4 is a fragmentary detail sectional view of a modified form.

Fig. 4 shows a modification in which the cuts 8 forming the jig saw puzzle do not extend quite all the way through the base, or in other words sufficient material is left to hold the parts together during the developing and fixing operations and yet not enough to form ragged edges when the parts are separated.

From the foregoing it will be apparent that a suitably cut base has been provided, the base being separable into a number of parts (similar to a jig saw puzzle), the face of the base being photo-sensitized and the back having applied thereto a suitable material to hold the puzzle together for sufficient time, to allow the development and fixing of the photo on the face. As heretofore stated the purpose of this is to permit of the exposing of any photo enlargement on the photo-sensitized face and, after the process of developing and fixing, have a cut out picture puzzle of individual choice.

The individual photo-sensitized jig saw puzzle might be sold to amateur photographers who would do all the work themselves or a photography shop could carry a supply of them and their customers could bring in favorite films and have them enlarged and printed on the jig saw puzzle.

I claim:

An article of manufacture comprising a suitably cut base of substantial thickness separable into a number of parts to form a jig saw puzzle, one face of the base being photo-sensitized and the other face of the base having an extremely thin sheet of material applied thereto over its entire surface and being capable of holding said parts together while handling prior to printing a picture on the photo-sensitized surface and only for sufficient time to allow the development and fixing of the photo, the parts when separated having all edges even and smooth.

WALTER R. JONES.